United States Patent
Hickerson

(10) Patent No.: US 7,708,244 B2
(45) Date of Patent: May 4, 2010

(54) DEVICE FOR USE IN VEHICLE STABILIZATION

(75) Inventor: William Hickerson, Hardyston Township, NJ (US)

(73) Assignee: Power Hawk Technologies, Inc., Rockaway, NJ (US)

( * ) Notice: Subject to any disclaimer, the term of this patent is extended or adjusted under 35 U.S.C. 154(b) by 360 days.

(21) Appl. No.: 11/789,733

(22) Filed: Apr. 25, 2007

(65) Prior Publication Data

US 2007/0252065 A1 Nov. 1, 2007

Related U.S. Application Data

(60) Provisional application No. 60/795,072, filed on Apr. 26, 2006.

(51) Int. Cl.
F16M 11/24 (2006.01)
E02C 3/00 (2006.01)
B66F 3/00 (2006.01)

(52) U.S. Cl. .................. 248/188.2; 248/420; 254/88; 254/124

(58) Field of Classification Search ............ 248/370, 248/371, 397, 161, 346.04, 346.05, 346.06, 248/291.1, 292.12, 580, 581, 595, 420, 157, 248/188.2; 254/88, 124, 126, 1
See application file for complete search history.

(56) References Cited

U.S. PATENT DOCUMENTS

| | | | | |
|---|---|---|---|---|
| 1,904,693 A | * | 4/1933 | Fayette et al. ............ | 254/88 |
| 2,237,620 A | * | 4/1941 | Doughty et al. ............ | 254/1 |
| 2,716,537 A | * | 8/1955 | Galonska ............ | 254/122 |
| 3,746,370 A | * | 7/1973 | Aulisa ............ | 285/15 |
| 3,938,780 A | * | 2/1976 | Hauptman ............ | 254/126 |
| 3,994,474 A | * | 11/1976 | Finkbeiner ............ | 254/88 |
| 4,013,268 A | * | 3/1977 | Williams ............ | 254/88 |
| 4,886,243 A | * | 12/1989 | Trumbull ............ | 254/88 |
| 5,868,379 A | * | 2/1999 | Ellis ............ | 254/124 |
| 6,089,544 A | * | 7/2000 | Ellis ............ | 254/1 |
| 7,182,177 B1 | * | 2/2007 | Simnacher ............ | 187/211 |

* cited by examiner

*Primary Examiner*—Amy J Sterling
*Assistant Examiner*—Tan Le
(74) *Attorney, Agent, or Firm*—Klauber & Jackson, LLC

(57) ABSTRACT

A vehicle stabilization device for use in stabilizing a vehicle to enable safe and rapid victim extrication operations by first responder and other personnel. The device includes a base plate for enabling its emplacement on an underlying support surface beneath the vehicle to be stabilized. First and second extender members, each having a base end and a distal end, are hingedly connected to each other at their distal ends. The base ends are rotably mounted to the base plate and are moveable toward each other from an initial spaced position. This reduction of spacing between the base ends acts in conjunction with the hinged attachment between the distal ends to increasingly incline the extender members with respect to the base plate and thereby increasingly elevate the distal ends above the base plate. A vehicle contact and support member is secured to the distal hinged ends, and elevates with the distal ends of the extender members until contact is made with the overlying portion of the vehicle. The drawn together base portions are retained in the position where contact with the vehicle is achieved, to provide stabilizing support to the vehicle.

7 Claims, 5 Drawing Sheets

DEVICE FOR USE IN VEHICLE STABILIZATION

RELATED APPLICATION

This application claims priority from U.S. provisional patent application Ser. No. 60/795,072, filed on Apr. 26, 2006.

FIELD OF INVENTION

This invention relates generally to rescue apparatus, and more specifically relates to devices for use in stabilizing a vehicle to enable safe and rapid victim extrication operations by first responder and other personnel.

BACKGROUND OF INVENTION

In the fire and rescue service first responders arriving at motor vehicle accidents access victims' injuries. Depending on the nature of the injuries and type of accident the first responders usually demobilize the victims as a precaution. This includes neck and back stabilization. During this process vehicle stabilization also needs to be addressed. Vehicles are stabilized to eliminate the rocking motion caused by rescuers entering and/or removing the victim. The most common procedure used for vehicle stabilization involves placing wood or plastic blocks (cribbing) under the vehicle and removing the spring movement. The usual hardware for this operation is step chucks. These step chucks are bulky and use valuable compartment space in first responding vehicles. Indeed such cribbing is sometimes not carried in first responding ambulances or chiefs' vehicles because of space limitations. Furthermore this prior cribbing is difficult and time-consuming to emplace and is not capable of self-adjusting in its height as weight is removed from or shifted in the vehicle

SUMMARY OF INVENTION

Now in accordance with the present invention a stabilizing device is provided which is an aluminum slotted device that ratchets, under a preloaded spring, automatically. The device takes up about one quarter of the space requirements of current cribbing and is about one third of the weight. The stabilizing device of the present invention also has a higher reach than the standard wood or plastic crib, again because of the space requirements.

The invention has two additional advantages over the current cribbing. First the standard cribbing is place under an auto and then is wedged in place. This is a two person task, one to place the cribbing and the second to gently lift the auto or hammer a wedge under the cribbing. The inventive device can be placed by one person, freeing up the other rescuer to perform other tasks. The invention is placed under the auto and engaged. The preloaded spring automatically ratchets until it rests against the auto. The crib is then set by the same rescuer by gently lifting the auto and removing the vehicle "spring" tension.

The second advantage arises during the course of a rescue the current cribbing needs to be checked and often re-tighten back with the wedges. The stabilizing device of the invention will automatically re-adjust itself by the pretension spring thus freeing up rescuer to do other tasks.

The vehicle stabilization device of the invention includes a base plate for enabling emplacement of the device on an underlying support surface beneath the vehicle to be stabilized. The underside of this plate preferably is provided with a slip reducing high friction surface. First and second extender members, each having a base end and a distal end, are hingedly connected to each other at their distal ends. The base ends are rotably mounted to the base plate and are moveable toward each other from an initial spaced position. This reduction of spacing between the base ends acts in conjunction with the hinged attachment between the distal ends to increasingly incline the extender members with respect to the base plate and thereby increasingly elevate the distal ends above the base plate. A vehicle contact and support member is secured to the distal hinged ends, and elevates with the distal ends of the extender members until contact is made with the overlying portion of the vehicle. The drawn together base portions are retained in the position where contact with the vehicle is achieved, to provide stabilizing support to the vehicle.

A spring biasing means provides the force enabling movement of the extender member base ends toward each other, and a locking means is provided for preventing such movement in the absence of manual release of the locking mean by an operator.

A one way movement means allows the released spring biased member ends to move toward each other until contact with the overlying vehicle is achieved, while preventing reversal of the movement, whereby the support of the vehicle automatically holds or adjusts to a more elevated position without further operator attention. The base plate has a U-shaped cross-section, and the one-way movement means comprises saw teeth extending along the bottom of longitudinally directed slots formed in the sides of the U-cross sectioned base plate, which teeth are engaged by a horizontal slide pin at the base end of the first of the extender members sliding into a notch between the saw teeth.

The horizontal slide pin comprises the means for rotably attaching the first extender plate to the base plate; and the second extender plate has a horizontal pin at its base end which is mounted for rotation at a fixed axis at the second end of the base plate.

The vehicle contact and support member includes angle supports mounted at the non-adjacent sides of the extender members proximate to their distal ends. One leg of each angle support face generally upward when the extender members are elevated. The generally upward facing sides form at least part of the support surface for the vehicle.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
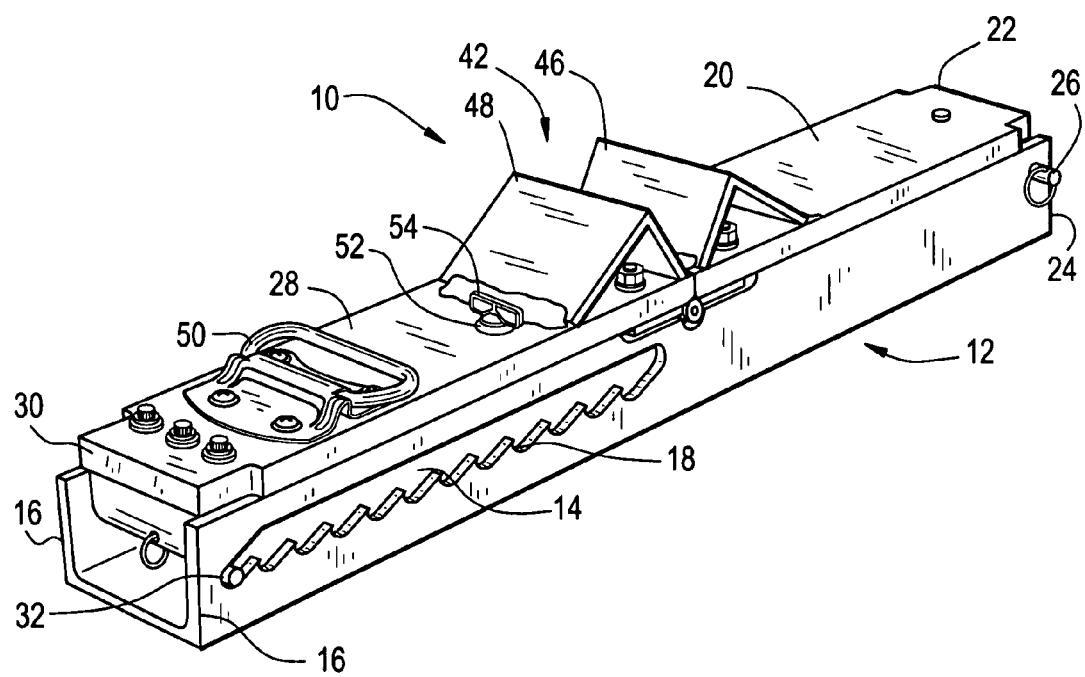
FIG. 1 is a perspective view of the device of the invention in its closed position.
Figure 2:
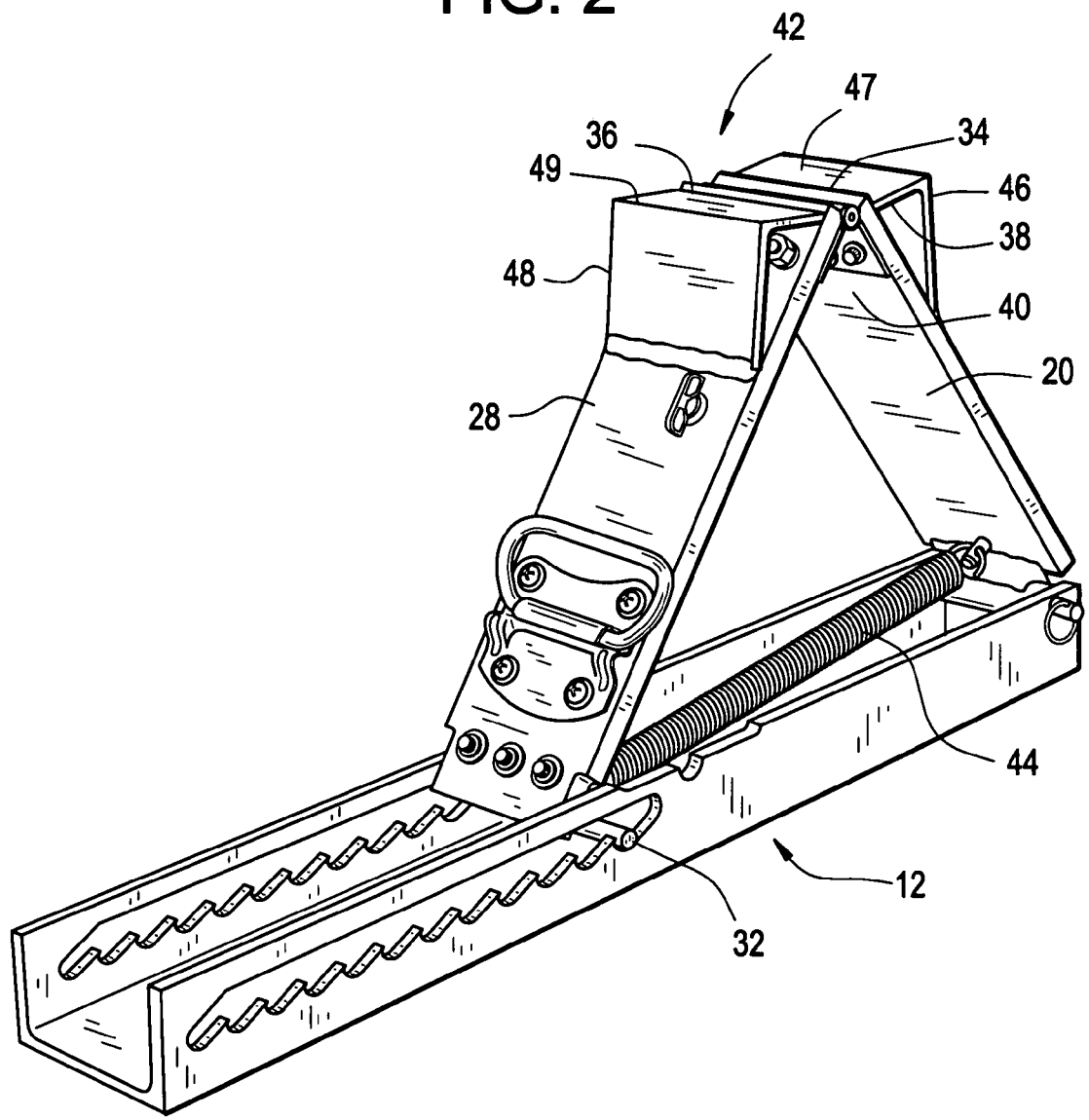
FIG. 2 is a perspective view of the device of the invention in its fully opened position.
Figure 3:
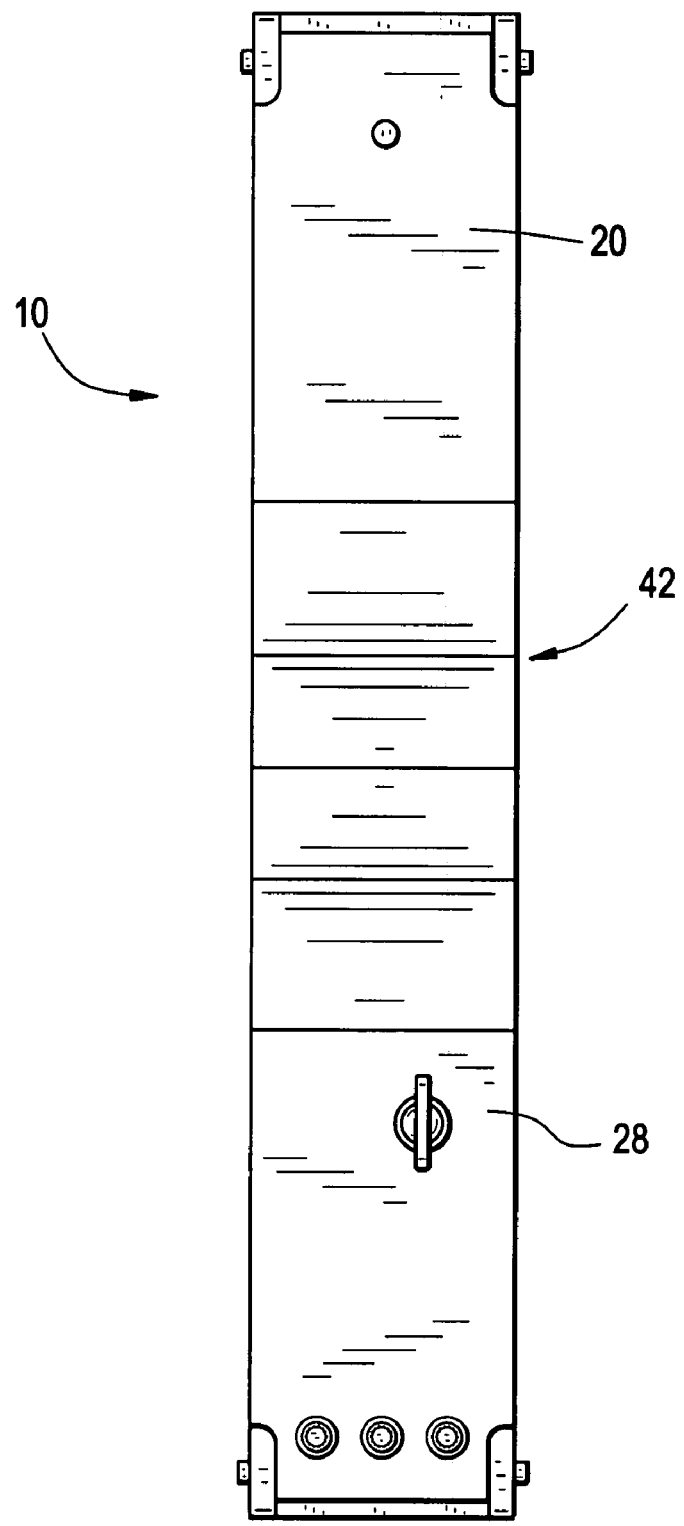
FIG. 3 is a top plan view of the device of FIG. 1.

As seen in FIGS. 1 and 2, the stabilizing device 10 of the invention includes a base plate 12 which is an aluminum channel having a U-shaped cross-section with notched slots 14 formed on each side 16 of the U cross-section. The notches are formed by saw teeth 18 at the lower edges of slots 14. A first extender member 20 is rotably attached at its base end 22 to the end 24 of base plate 12 by a pin 26. While member 20 can thus rotate about the axis of pin 26 it is fixed from movement along the length of base plate 12.

A second extender member 28 has a base end 30 which is provided with a slider pin 32. Slider pin 32 is positioned and supported at the notched bottom of slots 14. The distal ends 34 and 36 of members 20 and 28 are connected to one another by a hinge 38, which thus permits hinged movement between the extender members. Specifically, by moving the base end 30 of member 28 toward the base end 22 of member 20, the apex angle 40 between the hinged extender members decreases and the members 20 and 28 become increasingly inclined with respect to the underlying base plate 12. In consequence a contact and support means 42 secured to the distal ends of the hinged members 20 and 28 is increasingly elevated above base plate 12 until contact is made with a portion of the overlying vehicle which is to be stabilized.

The slider pin 32 during this movement of base end 30 toward base end 22 slides along the saw toothed bottom of slots 14, where the notches between teeth 18 lock the base end 30 against any reverse movement. The force enabling automatic movement of the base ends 30 and 22 toward each other is provided by a biasing spring 44 connected between the base ends. The contact and support means 42 is formed in most part by angle supports 46 and 48 which are secured to the non adjacent sides of the members 28 and 20. Note that even in the most elevated position of the device shown in FIG. 2 the upwardly facing portions 47 and 49 of supports 46 and 48 do not form a completely flat surface, but rather one which slopes toward its center, and that even the center of the support is not smooth and flat but rather has a degree of irregularity arising in part from the hinge 38. This shape of the support surface assists in securing the contacted portion of the vehicle.

Figure 4:
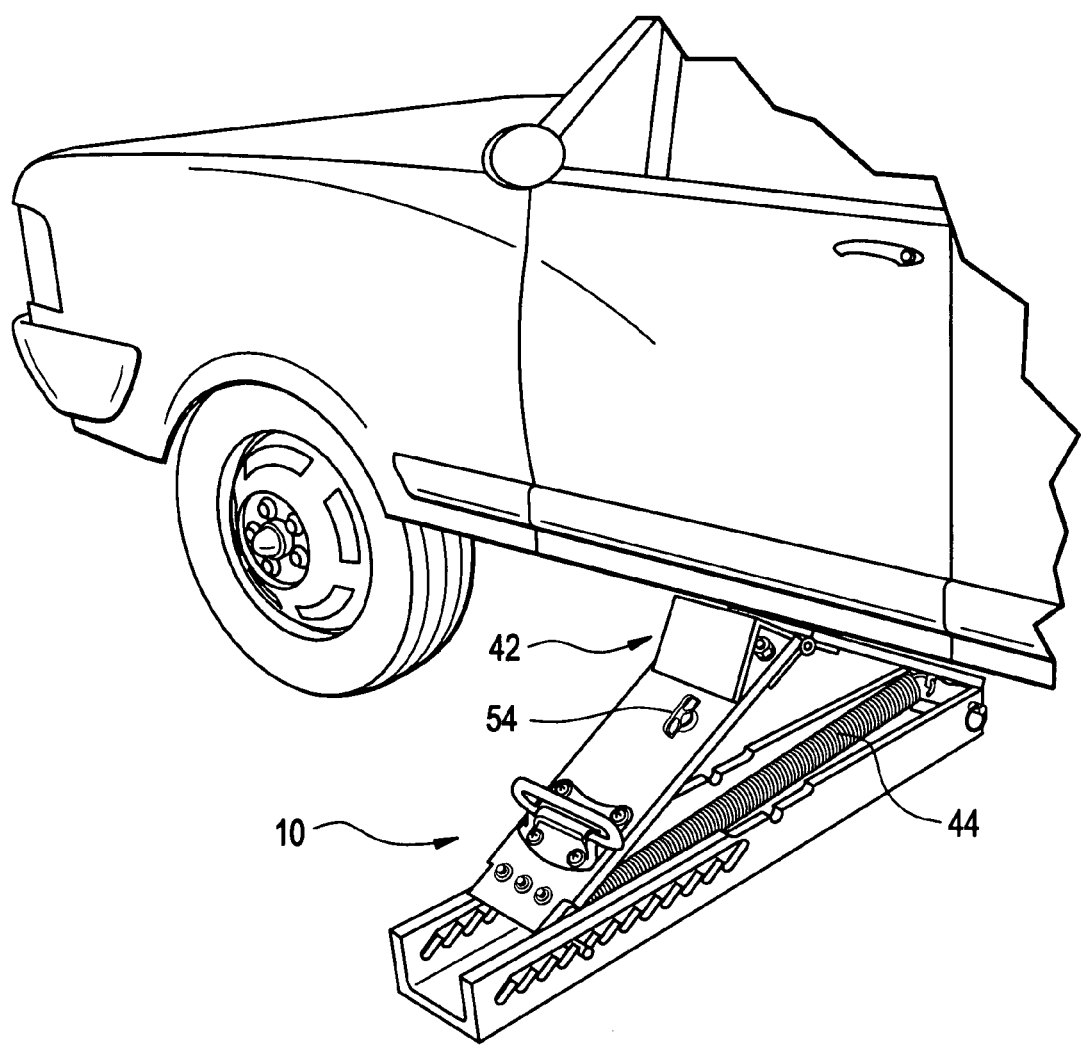
FIG. 4 illustrates the device of the invention in use in a vehicle stabilizing situation.
Figure 5:
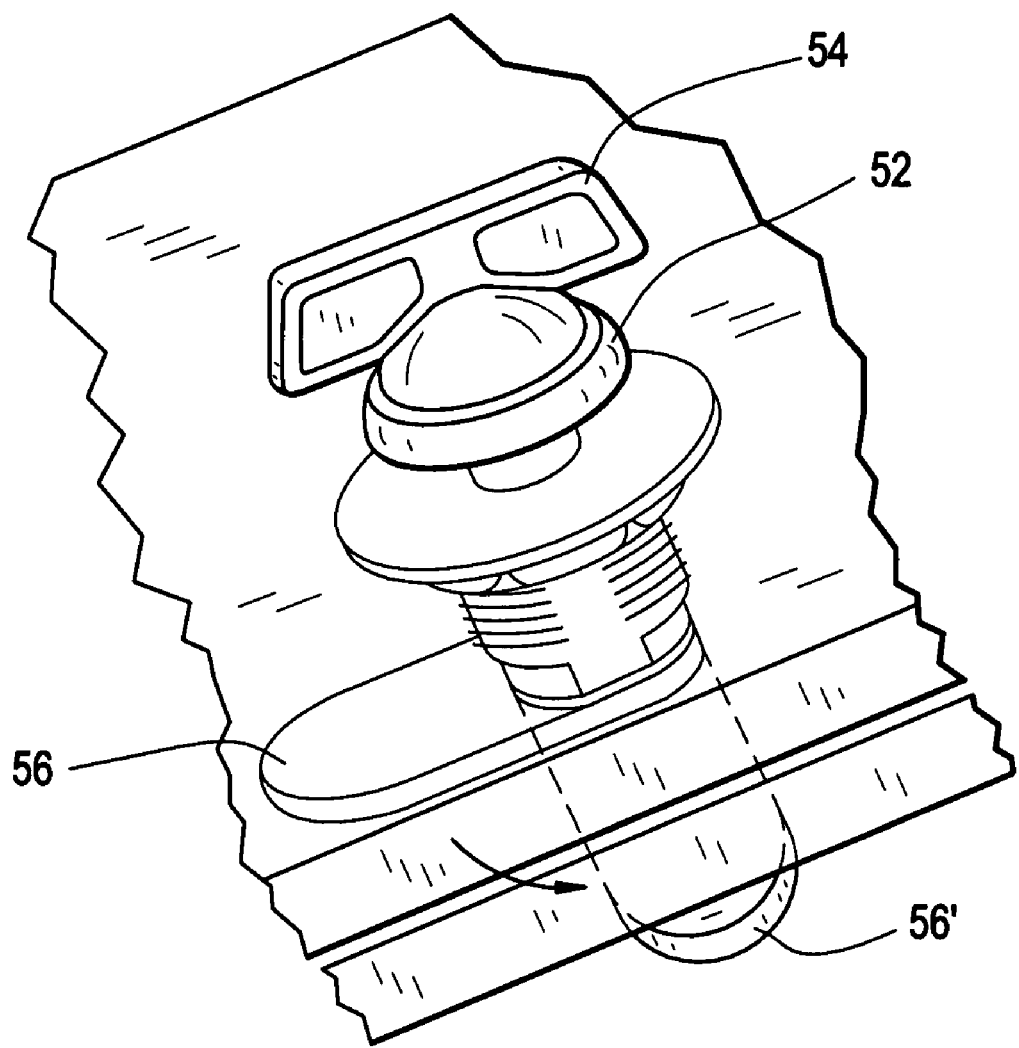
FIG. 5 is a partial view showing details of the locking device portion of the invention.

In FIG. 1 the device 10 is shown in its "closed" position, which is appropriate for storage and for carrying via a handle 50. In this position the two extender members 28 and 20 are essentially flat atop the base plate 12. In order to maintain this closed configuration against the spring 44, a simple locking means 52 having an external twist knob 54 is provided. Details of the locking means 52 are seen in the partial broken away view of FIG. 5 which shows the lock in its "open" or unlocked position. Rotating knob 54 causes projection 56 to move to position 56', which locks the device by restraining inclination of extender member 28. When the device of FIG. 1 is to be used, it is positioned beneath the vehicle to be stabilized (FIG. 4), and the locking means 52 disengaged as seen in FIG. 2. The biasing spring 44 then causes the device to automatically elevate as seen in FIG. 4 until the support means 42 contacts the vehicle and then is held at its elevated supporting position. When the operation at the vehicle is completed, the device is restored to its FIG. 1 configuration, by lifting slider pin 32 out of the notch in which it is locked, moving the extender members back to their flat positions as in FIG. 1, and twisting knob 54 to lock the device until its further need.

While the present invention has been set forth in terms of specific embodiments thereof, the instant disclosure is such that numerous variations upon the invention are now enabled to those skilled in the art, which variations yet reside within the scope of the present teaching. Accordingly, the invention is to be broadly construed, and limited only by the scope and spirit of the claims now appended hereto.

The invention claimed is:

1. A vehicle stabilization device for use in auto extrication and other stabilization operations, comprising:
    a base plate for enabling emplacement of the device on an underlying support surface beneath the vehicle to be stabilized;
    first and second extender members, each having a base end and a distal end, said members being hingedly connected to each other at their distal ends;
    the said base ends of said members being rotably mounted to said base plate and the base ends being moveable toward each other from an initial spaced position; said reduction of spacing between the said base ends in conjunction with the hinged attachment of said distal ends increasingly inclining said extender members with respect to said base plate and thereby increasingly elevating the said distal ends above the base plate;
    a vehicle contact and support member being secured to the distal hinged ends, which member elevates with the elevation of said distal ends, whereby said contact and support member contacts the overlying portion of the vehicle;
    means to retain the drawn together base portions in the position where contact with the vehicle is achieved, to provide stabilizing support to the vehicle;
    a spring biasing means connected to provide a force enabling said movement of said base ends toward each other, and further including a locking means for preventing said movement in the absence of manual release of the locking mean by an operator;
    a one way movement means for allowing the released spring biased member ends to move toward each other until contact with the overlying vehicle is achieved, while preventing reversal of the movement, whereby the support of the vehicle automatically holds or adjusts to a more elevated position without further operator attention; and
    said base plate having a U-shaped cross-section, said one-way movement means comprising saw teeth extending along the bottom of longitudinally directed slots formed in the sides of said U-cross sectioned base plate, which teeth are engaged by a horizontal slide pin at the base end of the first of said extender members sliding into a notch between the saw teeth.

2. A device in accordance with claim 1, wherein said horizontal slide pin comprises the means for rotably attaching the first extender plate to said base plate; and
    wherein the second extender plate has a horizontal pin at its base end which is mounted for rotation at a fixed axis at the second end of said base plate.

3. A device in accordance with claim 2, wherein said vehicle contact and support member comprises angle supports mounted at the non-adjacent sides of said extender members proximate to their distal ends one leg of each said angle support facing generally upward when the extender members are elevated, the generally upwardly facing sides forming at least part of a support surface for the said vehicle.

4. A device in accordance with claim 2, wherein the underside of said support plate is provided with a slip resistant surface.

5. A device in accordance with claim 1, wherein when said base ends of said extender members are in their maximum spaced position, the said extender plates lie substantially horizontally atop the support plate.

6. A device in accordance with claim 5, wherein the upwardly facing side of one said substantially flat extender members is provided with a handle to facilitate carrying of said device.

7. vehicle stabilization device for use in auto extracation and other stabilization operations, comprising:
    a base plate for emplacement of the device on an underlying support surface beneath the vehicle to be stabilized;

first and second extender members, each having a base end rotably attached to said base plate, the base ends being spaced from one another, the distance between the base plate attached ends of said extender members being adjustable; and the distal ends of said extender members being connected to each other by a hinge which enables the apex angle between the connected distal ends to be changed;

a support means for said vehicle being provided at the upwardly directed portions of said distal ends; reduction of said distance between said base plate attached ends decreasing the apex angle between said distal ends and elevating said support means above said base plate;

means for drawing said base ends together to a position where said support means is raised to contact the overlying vehicle portion;

means to retain the drawn together base portions in the position where contact with the vehicle and support thereof is achieved;

a spring biasing means connected to provide a force enabling said movement of said base ends toward each other, and further including a locking means for preventing said movement in the absence of manual release of the locking mean by an operator; and said base plate having a U-shaped cross-section, and wherein a one-way movement of said base ends toward each other is enabled by saw teeth which extend along the bottom of longitudinally directed slots formed in the sides of said U cross-sectioned base plate, which teeth are engaged by a horizontal slide pin at the base end of the first of said extender members sliding into a notch between the saw teeth.

* * * * *